United States Patent
Seino et al.

(10) Patent No.: US 12,435,076 B2
(45) Date of Patent: Oct. 7, 2025

(54) FLUORINE-CONTAINING PYRIMIDINE COMPOUND AND METHOD FOR PRODUCING SAME

(71) Applicant: UNIMATEC CO., LTD., Tokyo (JP)

(72) Inventors: Junya Seino, Kitaibaraki (JP); Rie Aotsu, Kitaibaraki (JP); Keisuke Kokin, Kitaibaraki (JP)

(73) Assignee: UNIMATEC CO., LTD. (JP)

( * ) Notice: Subject to any disclaimer, the term of this patent is extended or adjusted under 35 U.S.C. 154(b) by 408 days.

(21) Appl. No.: 17/768,556

(22) PCT Filed: Oct. 29, 2020

(86) PCT No.: PCT/JP2020/040682
§ 371 (c)(1),
(2) Date: Apr. 13, 2022

(87) PCT Pub. No.: WO2021/085550
PCT Pub. Date: May 6, 2021

(65) Prior Publication Data
US 2024/0124436 A1    Apr. 18, 2024

(30) Foreign Application Priority Data
Nov. 1, 2019  (JP) .................. 2019-200237

(51) Int. Cl.
C07D 417/04    (2006.01)
A01P 3/00      (2006.01)
C07D 409/04    (2006.01)

(52) U.S. Cl.
CPC .......... *C07D 417/04* (2013.01); *A01P 3/00* (2021.08); *C07D 409/04* (2013.01)

(58) Field of Classification Search
CPC ........ C07D 417/04; C07D 409/04; A61P 3/00
See application file for complete search history.

(56) References Cited

U.S. PATENT DOCUMENTS

| 5,747,423 A | 5/1998 | Scheiblich et al. |
| 5,922,726 A | 7/1999 | Scheiblich et al. |

(Continued)

FOREIGN PATENT DOCUMENTS

| CA | 2781404 A1 | 6/2011 |
| CN | 109503562 A | 3/2019 |

(Continued)

OTHER PUBLICATIONS

Office Action issued in corresponding Indian Patent Application No. 202237027146, dated Feb. 14, 2023, with English translation (5 pages).

Third Party Observation issued in corresponding European Patent Application No. 20880783.4, dated Mar. 6, 2023 (9 pages).

Siva Prasad Das et al., "Selective Oxidation of Organic Sulfides by Mononuclear and Dinuclear Peroxotungsten(VI) Complexes" Tetrahedron Letters 53 (2012), pp. 1163-1168.

(Continued)

*Primary Examiner* — Rebecca L Anderson
(74) *Attorney, Agent, or Firm* — Harness, Dickey & Pierce, P.L.C.

(57) ABSTRACT

A fluorine-containing pyrimidine compound represented by formula (1), (2) or (3) is provided:

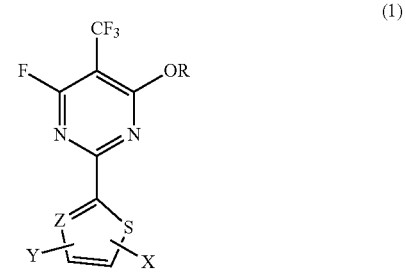

(1)

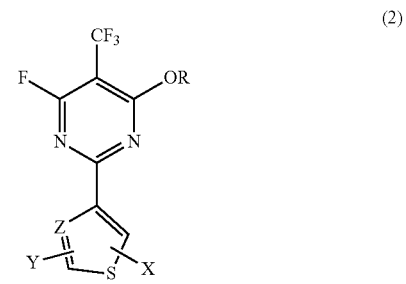

(2)

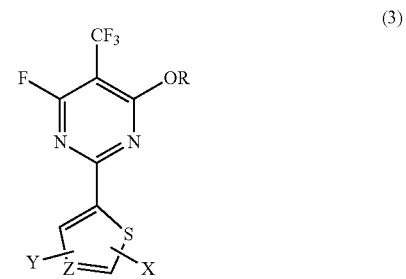

(3)

wherein in formulae (1) to (3), R represents a hydrocarbon group having 1 to 12 carbon atoms, X and Y each independently represent a hydrogen atom, a halogen atom, a hydrocarbon group having 1 to 10 carbon atoms, $-C_nF_{2n+1}$, a nitro group, a boronic acid group, $-OA^1$, $-SO_mA^1$, $-NA^1A^2$, $-COOA^1$ or $-CONA^1A^2$, Z represents CW or N, W represents a hydrogen atom, a halogen atom, a hydrocarbon group having 1 to 10 carbon atoms, $-C_nF_{2n+1}$, a nitro group, a boronic acid group, $-OA^1$, $-SO_mA^1$, $-NA^1A^2$, $-COOA^1$ or $-CONA^1A^2$, n is an integer of 1 to 10 and m is an integer of 0 to 3, and $A^1$ and $A^2$ each independently represent a hydrogen atom or a hydrocarbon group having 1 to 10 carbon atoms.

6 Claims, No Drawings

(56) References Cited

U.S. PATENT DOCUMENTS

| | | | |
|---|---|---|---|
| 8,445,408 | B2 | 5/2013 | Minn et al. |
| 2003/0171589 | A1 | 9/2003 | Oguma et al. |
| 2004/0110749 | A1 | 6/2004 | Nakatani et al. |
| 2008/0132522 | A1 | 6/2008 | Rheinheimer et al. |
| 2011/0034474 | A1 | 2/2011 | Dorsch et al. |
| 2011/0053916 | A1 | 3/2011 | Wang et al. |
| 2011/0136666 | A1 | 6/2011 | Whittingham et al. |
| 2012/0264947 | A1 | 10/2012 | Frasetto |
| 2013/0090476 | A1 | 4/2013 | Cristau et al. |
| 2013/0150362 | A1 | 6/2013 | Zhao et al. |
| 2013/0296561 | A1 | 11/2013 | Bessembinder et al. |
| 2014/0249137 | A1 | 9/2014 | Wang et al. |
| 2016/0038784 | A1 | 2/2016 | Hou |
| 2016/0361589 | A1 | 12/2016 | Hou |
| 2019/0135793 | A1 | 5/2019 | Petrocchi et al. |
| 2019/0135800 | A1 | 5/2019 | Kamenecka et al. |
| 2021/0403455 | A1 | 12/2021 | Seino et al. |

FOREIGN PATENT DOCUMENTS

| | | |
|---|---|---|
| CN | 109942561 A | 6/2019 |
| EP | 0819690 A2 | 1/1998 |
| EP | 1334956 A2 | 8/2003 |
| EP | 1364946 A1 | 11/2003 |
| JP | S59-104364 A | 6/1984 |
| JP | S63-216877 A | 9/1988 |
| JP | H07-196628 A | 8/1995 |
| JP | 2000-001460 A | 1/2000 |
| WO | 94-29300 A1 | 12/1994 |
| WO | 2006-005571 A1 | 1/2006 |
| WO | 2009-129905 A1 | 10/2009 |
| WO | 2009-138712 A2 | 11/2009 |
| WO | 2011-019405 A1 | 2/2011 |
| WO | 2012-027236 A1 | 3/2012 |
| WO | 2012-098049 A1 | 7/2012 |
| WO | 2013-086131 A1 | 6/2013 |
| WO | 2016-019644 A1 | 2/2016 |
| WO | 2017-139603 A1 | 8/2017 |
| WO | 2020-116296 A1 | 6/2020 |

OTHER PUBLICATIONS

Kandasamy Jeyakumar et al., "Simple and Efficient Method for the Oxidation of Sulfides to Sulfones Using Hydrogen Peroxide and a Mo(VI) Based Catalyst", Catalysis Communications 10 (2009), pp. 1948-1951.

Decision of Refusal issued in corresponding Chinese Patent Application No. 202080070690.1 dated Mar. 17, 2023, with English translation (9 Pages).

Pei-Zhi Zhang et al., "Direct Regioselective Csp2-H Trifluoromethylation of Pyrimidinones and Pyridinones", Science Direct, Tetrahedron, vol. 72, Issue 23, pp. 3250-3255, Jun. 9, 2016.

Bin Yang et al., "Visible-Light Photoredox Decarboxylation of Perfluoroarenelodine(III) Trifluoroacetates for C—H Trifluoromethylation of (Hetero)arenes", American Chemical Society, ACS Catalysis, vol. 8, pp. 2839-2843, Mar. 1, 2018.

Yao Ouyang et al., "Trifluoromethanesulfonic Anhydride as a Low-Cost and Versatile Trifluoromethylation Reagent", European Journal of Organic Chemistry, Angewandte Chemie International Edition, vol. 57, Issue 23, pp. 6926-6929, Apr. 19, 2018.

International Search Report for corresponding International Application No. PCT/JP2020/040682 dated Dec. 22, 2020 (7 Pages).

Y. Inouye et al., "A Facile One-pot Preparation of 2-Methyl- and 2-Phenyl-4 fluoro-5-trifluoromethyl-6-methoxypyrimidine from methyl 2-hydryl-2-(perfluoromethyl)perfluoropropylether", Journal of Fluorine Chemistry, vol. 27, No. 2, pp. 231-236, Oct. 20, 1984.

Written Opinion for corresponding International Application No. PCT/JP2020/040682 dated Dec. 22, 2020, with English translation (6 Pages).

International Preliminary Report on Patentability for corresponding International Application No. PCT/JP2020/040682 dated Dec. 22, 2020, with English translation (7 Pages).

Second Office Action issued in corresponding Chinese Patent Application No. 202080070690.1 dated Jan. 3, 2023. with English translation (11 Pages).

Extended European Search Report issued in corresponding European Patent Application No. 20880783.4 dated Sep. 8, 2023 (7 Pages).

Office Action issued for the corresponding Chinese Patent Application No. 202080070690.1; dated Jul. 6, 2022 (total 12 pages).

Office Action for corresponding European Patent Application No. 20880783.4 dated Aug. 18, 2025 (4 Pages).

FLUORINE-CONTAINING PYRIMIDINE COMPOUND AND METHOD FOR PRODUCING SAME

CROSS REFERENCE TO RELATED APPLICATIONS

This is the National Stage of International Application No. PCT/JP2020/040682, filed Oct. 29, 2020, which claims the benefit of Japanese Patent Application No. 2019-200237 filed Nov. 1, 2019.

BACKGROUND

Technical Field

The present disclosure relates to a fluorine-containing pyrimidine compound and a method for producing the same.

Related Art

Conventionally, fluorine-containing pyrimidine compounds have been reported to have various biological activities. Among them, a compound having a thiophene ring or a thiazole ring as a substituent at the 2-position of the pyrimidine ring is expected to be used in the fields of medicine and agrochemicals.

More specifically, International Publication No. WO 2011/019405, International Publication No. WO 2013/086131, and International Publication No. WO 2009/129905 disclose a compound having a thiophene ring at the 2-position of a pyrimidine ring. International Publication No. WO 2011/019405 reports that a compound having a 2-(2-thienyl)-5-(trifluoromethyl)pyrimidine structure has a tubercle *bacillus* growth inhibitory activity. International Publication No. WO 2013/086131 reports that a compound having a 2-(2-thienyl)-pyrimidine structure has a growth inhibitory activity on influenza A virus having drug resistance. In International Publication No. WO 2009/129905, a compound having a 2-(3-thienyl)-pyrimidine structure is synthesized as an antitumor active compound.

Moreover, International Publication No. WO 2012/027236, International Publication No. WO 2016/196644, and International Publication No. WO 2017/139603 disclose a compound having a thiazole ring at the 2-position of a pyrimidine ring. International Publication No. WO 2012/027236 reports that a compound having a 2-(2-thiazolyl)-pyrimidine structure has an antitumor activity against prostate tumors and the like. International Publication No. WO 2016/196644 reports that a compound having a 2-(4-thiazolyl)-5-(trifluoromethyl)pyrimidine structure has an antitumor activity against Burkitt lymphoma. International Publication No. WO 2017/139603 reports that a compound having a 2-(5-thiazolyl)-pyrimidine structure is effective for a treatment of hypertension, PTSD, depression, pain and the like. From such viewpoints, introduction of substituents to the 4- and 6-positions of the pyrimidine ring has drawn attention in anticipation of further improvement in the activity.

Tetrahedron, Vol. 72, 2016, pp. 3250-3255, ACS Catalysis, Vol. 8, 2018, pp. 2839-2843, and Angewandte Chemie International Edition, Vol. 57, 2018, pp. 6926-6929 disclose, on the other hand, a method for synthesizing a pyrimidine compound having a trifluoromethyl group at the 5-position of a pyrimidine ring and substituents at the 4-position and the 6-position. More specifically, Tetrahedron, Vol. 72, 2016, pp. 3250-3255 reports a synthetic method using sodium trifluoromethanesulfinate (Langlois reagent), ACS Catalysis, Vol. 8, 2018, pp. 2839-2843 reports a synthetic method using a trifluoroacetic acid derivative, and Angewandte Chemie International Edition, Vol. 57, 2018, pp. 6926-6929 reports a synthetic method using trifluoromethanesulfonic acid anhydride.

Technical Problem

However, from the viewpoint of reactivity and selectivity, conventionally, it has been difficult to produce a fluorine-containing pyrimidine compound having a fluorine-containing substituent at the 5-position of the pyrimidine ring, a heterocyclic ring as a substituent at the 2-position, and substituents at the 4-position and the 6-position, and such a fluorine-containing pyrimidine compound has not been reported. The fluorine-containing pyrimidine compound is expected to have various biological activities, and a novel fluorine-containing pyrimidine compound having substituents at the 4- and 6-positions of a pyrimidine ring and a heterocyclic ring as a substituent at the 2-position, and establishment of a production method therefor, have been desired.

In the production method reported in Tetrahedron, Vol. 72, 2016, pp. 3250-3255, the regioselectivity upon introduction of a trifluoromethyl group is low, which thereby raises a concern of decreasing introduction efficiency of trifluoromethyl group for a substrate having a plurality of heterocyclic rings such as a pyrimidine compound substituted with a heterocyclic ring, or a concern of difficulty in introducing a trifluoromethyl group. Moreover, there have been problems such as not only using 3 times an amount of Langlois reagent as a trifluoromethylating agent with respect to the substrate but also using manganese acetate (III) hydrate that is harmful as an oxidizing agent in an amount 3 times that of the substrate.

It is considered that by further modification and derivatization of the compound obtained by the production methods reported in ACS Catalysis, Vol. 8, 2018, pp. 2839-2843, and Angewandte Chemie International Edition, Vol. 57, 2018, pp. 6926-6929, it is converted into the fluorine-containing pyrimidine compound. However, there have been cases where complexity and reduction in efficiency due to an increase in the number of steps are unavoidable, or the production of the fluorine-containing pyrimidine compound itself is difficult. Further, it is considered to be unsuitable for practical use because irradiation with light in the presence of a ruthenium complex catalyst is necessary, 2.5 to 3 times an amount of trifluoromethylating agent is required for use with respect to the substrate in ACS Catalysis, Vol. 8, 2018, pp. 2839-2843, and Angewandte Chemie International Edition, Vol. 57, 2018, pp. 6926-6929 times an amount of trifluoromethylating agent is required for use with respect to the substrate in Angewandte Chemie International Edition, Vol. 57, 2018, pp. 6926-6929.

Therefore, the present inventors have found that a thiophene ring structure or a thiazole ring structure can be introduced at the 2-position between the two nitrogen atoms on a pyrimidine ring by reacting a specific raw material, and thus have completed the present disclosure. Namely, it is an object of the present disclosure to provide a novel fluorine-containing pyrimidine compound that has substituents at the 4-position and the 6-position of the pyrimidine ring and a thiophene ring structure or a thiazole ring structure as a substituent at the 2-position, which has not been known conventionally, and a production method capable of easily producing the fluorine-containing pyrimidine compound.

SUMMARY

The configuration of the present disclosure is as follows.

[1] An aspect of the present disclosure is a fluorine-containing pyrimidine compound represented by the following formula (1), (2) or (3):

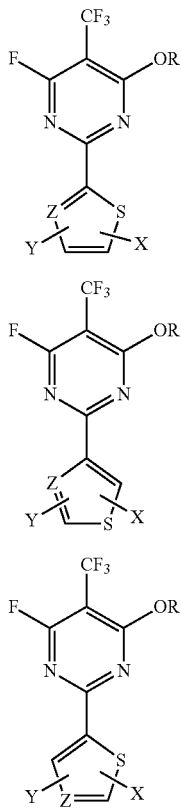

wherein

R represents a hydrocarbon group having 1 to 12 carbon atoms,

X and Y each independently represent a hydrogen atom, a halogen atom, a hydrocarbon group having 1 to 10 carbon atoms, $—C_nF_{2n+1}$ where n is an integer of 1 to 10, a nitro group, a boronic acid group, $—OA^1$, $—SO_mA^1$ where m is an integer of 0 to 3, $—NA^1A^2$, $—COOA^1$ or $—CONA^1A^2$, Z represents CW or N, W represents a hydrogen atom, a halogen atom, a hydrocarbon group having 1 to 10 carbon atoms, $—C_nF_{2n+1}$ where n is an integer of 1 to 10, a nitro group, a boronic acid group, $—OA^1$, $—SO_mA^1$ where m is an integer of 0 to 3, $—NA^1A^2$, $—COOA^1$ or $—CONA^1A^2$, and $A^1$ and $A^2$ each independently represent a hydrogen atom or a hydrocarbon group having 1 to 10 carbon atoms.

[2] In the aspect of the present disclosure, R is an alkyl group having 1 to 10 carbon atoms.

[3] Another aspect of the present disclosure is a method for producing a fluorine-containing pyrimidine compound, including:

(a) a step of reacting a fluoroisobutylene derivative represented by the following formula (4) with a compound represented by the following formula (5) or a salt thereof to obtain a fluorine-containing pyrimidine compound of the following formula (1):

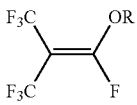

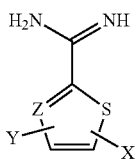

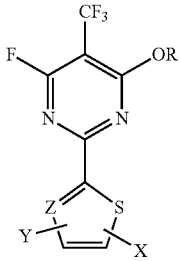

(b) a step of reacting a fluoroisobutylene derivative represented by the following formula (4) with a compound represented by the following formula (6) or a salt thereof to obtain a fluorine-containing pyrimidine compound of the following formula (2):

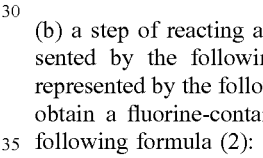

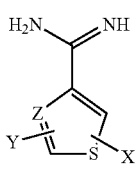

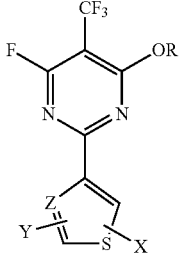

or (c) a step of reacting a fluoroisobutylene derivative represented by the following formula (4) with a compound represented by the following formula (7) or a salt thereof to obtain a fluorine-containing pyrimidine compound of the following formula (3):

(4)

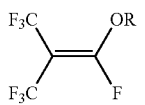

(7)

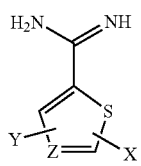

(3)

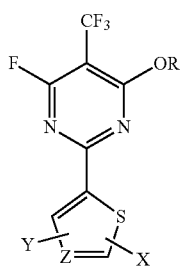

wherein

R represents a hydrocarbon group having 1 to 12 carbon atoms,

X and Y each independently represent a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, Z represents CW or N, W represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and $A^1$ and $A^2$ each independently represent a hydrogen atom or a hydrocarbon group having 1 to 10 carbon atoms.

[4] Another aspect of the present disclosure is a method for producing a fluorine-containing pyrimidine compound, including:

(d) a step of reacting a fluoroisobutane derivative represented by the following formula (8) with a compound represented by the following formula (5) or a salt thereof to obtain a fluorine-containing pyrimidine compound of the following formula (1):

(8)

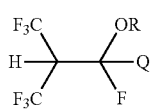

(5)

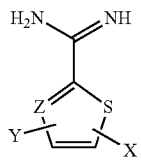

(1)

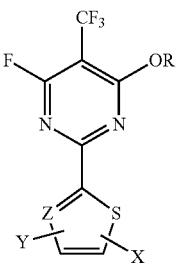

(e) a step of reacting a fluoroisobutane derivative represented by the following formula (8) with a compound represented by the following formula (6) or a salt thereof to obtain a fluorine-containing pyrimidine compound of the following formula (2):

(8)

(6)

(2)

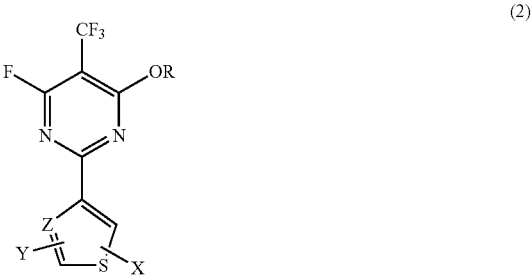

or (f) a step of reacting a fluoroisobutane derivative represented by the following formula (8) with a compound represented by the following formula (7) or a salt thereof to obtain a fluorine-containing pyrimidine compound of the following formula (3):

(8)

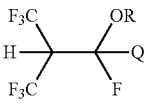

(7)

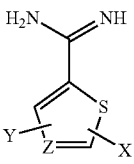

-continued (3)

[Structure: pyrimidine with CF3, F, OR substituents, connected to thiophene ring with X, Y, Z substituents]

wherein
Q represents a halogen atom, —OA$^1$, —SO$_m$A$^1$ where m is an integer of 0 to 3, or —NA$^1$A$^2$,
R represents a hydrocarbon group having 1 to 12 carbon atoms,
X and Y each independently represent a hydrogen atom, a halogen atom, a hydrocarbon group having 1 to 10 carbon atoms, —C$_n$F$_{2n+1}$ where n is an integer of 1 to 10, a nitro group, a boronic acid group, —OA$^1$, —SO$_m$A$^1$ where m is an integer of 0 to 3, —NA$^1$A$^2$, —COOA$^1$ or —CONA$^1$A$^2$,
Z represents CW or N,
W represents a hydrogen atom, a halogen atom, a hydrocarbon group having 1 to 10 carbon atoms, —C$_n$F$_{2n+1}$ where n is an integer of 1 to 10, a nitro group, a boronic acid group, —OA$^1$, —SO$_m$A$^1$ where m is an integer of 0 to 3, —NA$^1$A$^2$, —COOA$^1$ or —CONA$^1$A$^2$, and
A$^1$ and A$^2$ each independently represent a hydrogen atom or a hydrocarbon group having 1 to 10 carbon atoms.
[5] In the aspect of the present disclosure according to the method for producing a fluorine-containing pyrimidine compound, R is an alkyl group having 1 to 10 carbon atoms.

Effects of Invention

A novel fluorine-containing pyrimidine compound having substituents at the 4-position and 6-position of the pyrimidine ring, and a thiophene ring structure or a thiazole ring structure as a thiophene-based substituent at the 2-position, and a production method capable of easily producing the fluorine-containing pyrimidine compound, can be provided.

DETAILED DESCRIPTION

Hereinafter, embodiments of the present disclosure will be described in detail. However, the scope of the present disclosure is not limited to the specific examples described below.
(Fluorine-Containing Pyrimidine Compound)
The fluorine-containing pyrimidine compound in one embodiment is represented by the following formula (1), (2) or (3):

(1)

[Structure: pyrimidine with CF3, F, OR substituents, connected to thiophene ring with X, Y, Z substituents]

(2)

[Structure: pyrimidine with CF3, F, OR substituents, connected to thiophene ring with X, Y, Z substituents]

(3)

[Structure: pyrimidine with CF3, F, OR substituents, connected to thiophene ring with X, Y, Z substituents]

wherein in the above formulae (1) to (3),
R represents a hydrocarbon group having 1 to 12 carbon atoms,
X and Y each independently represent a hydrogen atom, a halogen atom, a hydrocarbon group having 1 to 10 carbon atoms, —C$_n$F$_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$,
Z represents CW or N,
W represents a hydrogen atom, a halogen atom, a hydrocarbon group having 1 to 10 carbon atoms, —C$_n$F$_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, and
A$^1$ and A$^2$ each independently represent a hydrogen atom or a hydrocarbon group having 1 to 10 carbon atoms.

R is not particularly limited as long as it is a hydrocarbon group having 1 to 12 carbon atoms and is composed of a carbon atom and a hydrogen atom, and includes a chain hydrocarbon group, an aromatic hydrocarbon group, an alicyclic hydrocarbon group and the like. The chain hydrocarbon group is not particularly limited as long as the total number of carbon atoms is 1 to 12, and may be a linear hydrocarbon group or a branched chain hydrocarbon group. When R is an aromatic hydrocarbon group, the aromatic hydrocarbon group is not particularly limited as long as the total number of carbon atoms is 6 to 12, and may be an aromatic hydrocarbon group having a substituent or an aromatic hydrocarbon group having no substituent. Moreover, the aromatic hydrocarbon group may have a condensed polycyclic structure. When R is an alicyclic hydrocarbon group, the alicyclic hydrocarbon group is not particularly limited as long as the total number of carbon atoms is 3 to 12, and may be an alicyclic hydrocarbon group having a substituent or an alicyclic hydrocarbon group having no substituent. Further, the alicyclic hydrocarbon group may have a bridged ring structure.

Examples of the chain hydrocarbon group include alkyl groups such as a methyl group, an ethyl group, a n-propyl group, an i-propyl group, a n-butyl group, an i-butyl group, a sec-butyl group, a ter-butyl group, a pentyl group, a hexyl group, a heptyl group, an octyl group, a nonyl group, a decyl group, an undecyl group and a dodecyl group;

alkenyl groups such as an ethenyl group, a propenyl group, a butenyl group, a pentenyl group, a hexenyl group, a heptenyl group, an octenyl group, a nonenyl group, a decenyl group, an undecenyl group and a dodecenyl group; and alkynyl groups such as an ethynyl group, a propynyl group, a butynyl group, a pentynyl group, a hexynyl group, a heptynyl group, an octynyl group, a nonynyl group, a decynyl group, an undecynyl group and a dodecynyl group.

Examples of the aromatic hydrocarbon group include a phenyl group and a naphthyl group.

Examples of the alicyclic hydrocarbon group include a saturated or unsaturated cyclic hydrocarbon group, and examples of the cyclic hydrocarbon group include a cyclopropyl group, a cyclobutyl group, a cyclohexyl group, a cyclopentyl group, an adamantyl group and a norbornyl group.

R is preferably an alkyl group having 1 to 10 carbon atoms. R being an alkyl group having 1 to 10 carbon atoms enables the fluoroisobutylene derivative of formula (4) and the fluoroisobutane derivative of formula (8), which are raw materials of the fluorine-containing pyrimidine compound, to be easily prepared.

X and Y each independently represent a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, and each preferably represent a hydrogen atom, a halogen atom or a hydrocarbon group having 1 to 10 carbon atoms. X and Y may be the same or different from each other.

In X and Y, the halogen atom is F, Cl, Br or I, and preferably F or Cl.

In X and Y, the hydrocarbon group having 1 to 10 carbon atoms is not particularly limited as long as it is a hydrocarbon group composed of a carbon atom and a hydrogen atom, and can be, for example, a hydrocarbon group having 1 to 10 carbon atoms in R described above.

In X and Y, —$C_nF_{2n+1}$ is not particularly limited as long as it is a perfluoroalkyl group composed of a carbon atom and a fluorine atom, and may be linear or branched. In addition, n is an integer of 1 to 10, and preferably an integer of 1 to 3.

In X and Y, $A^1$ included in —$OA^1$ and —$SO_mA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above. Further, m is an integer of 0 to 3, preferably an integer of 0 to 2, and more preferably an integer of 0 to 1.

In X and Y, $A^1$ and $A^2$ included in —$NA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

In X and Y, $A^1$ included in —$COOA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above.

In X and Y, $A^1$ and $A^2$ included in —$CONA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

Z represents CW or N. When Z is CW, W represents a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, and preferably represents a hydrogen atom, a halogen atom or a hydrocarbon group having 1 to 10 carbon atoms.

In W, the halogen atom is F, Cl, Br or I, and preferably F or Cl.

In W, the hydrocarbon group having 1 to 10 carbon atoms is not particularly limited as long as it is a hydrocarbon group composed of a carbon atom and a hydrogen atom, and can be, for example, a hydrocarbon group having 1 to 10 carbon atoms in R described above.

In W, —$C_nF_{2n+1}$ is not particularly limited as long as it is a perfluoroalkyl group composed of a carbon atom and a fluorine atom, and may be linear or branched. In addition, n is an integer of 1 to 10, and preferably an integer of 1 to 3.

In W, $A^1$ included in —$OA^1$ and —$SO_mA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above. Further, m is an integer of 0 to 3, preferably an integer of 0 to 2, and more preferably an integer of 0 to 1.

In W, $A^1$ and $A^2$ included in —$NA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

In W, $A^1$ included in —$COOA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above.

In W, $A^1$ and $A^2$ included in —$CONA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

In the above formulae (1) to (3), when W and X are adjacent to each other, W and X may be bonded to each other to form a ring together with the carbon atoms to which they are bonded, and when W and Y are adjacent to each other, W and Y may be bonded to each other to form a ring together with the carbon atoms to which they are bonded. The rings thus formed may be an aromatic ring or a non-aromatic ring, and may be a carbon ring or a heterocyclic ring. When a ring is formed, the number of carbon atoms on the ring is not particularly limited, but is preferably 4 to 20, more preferably 6 to 20, and still more preferably 6 to 10. Examples of such rings include a benzothiophene ring. Among these, a benzothiazole ring is preferred.

The fluorine-containing pyrimidine compound in one embodiment has a specific substituent (thiophene group or thiazole group) at the 2-position of the pyrimidine ring, and specific substituents (—OR, —$CF_3$ and —F) at the 4-position, 5-position and 6-position of the pyrimidine ring, and thereby it can have an excellent effect from the viewpoint of structural expandability. In particular, desired biological activity (for example, growth inhibitory activity on various viruses, antibacterial activity against various bacteria, antitumor activity) can be expected, and for example, control activity on pathogens of rice blast and the like can be expected. The thiophene ring structure or thiazole ring structure located on the 2-position of the pyrimidine ring may or may not have a substituent. The thiophene ring structure or the thiazole ring structure having a substituent can further impart properties to the fluorine-containing pyrimidine compound in one embodiment. Moreover, the substituents on the 4- and 6-positions of the pyrimidine ring being different groups (—OR and —F) can facilitate derivatization into an asymmetric structure, which can also be expected to be used as an intermediate. More specifically, reacting the fluorine-containing pyrimidine compound under acidic conditions to modify —OR can provide a derivative. Moreover, reacting the fluorine-containing pyrimidine compound under basic conditions to modify —F can provide a derivative. The fluorine-containing pyrimidine compound in one embodiment is useful in the field of, for example, electronic materials such as organic semiconductors and liquid crystals.

(Method for Producing Fluorine-Containing Pyrimidine Compound)

A method for producing a fluorine-containing pyrimidine compound in one embodiment includes:

(a) a step of reacting a fluoroisobutylene derivative represented by the following formula (4) with a compound represented by the following formula (5) or a salt thereof to obtain a fluorine-containing pyrimidine compound of the following formula (1):

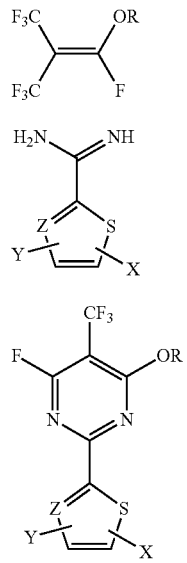

(b) a step of reacting a fluoroisobutylene derivative represented by the following formula (4) with a compound represented by the following formula (6) or a salt thereof to obtain a fluorine-containing pyrimidine compound of the following formula (2):

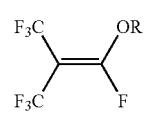

(4)

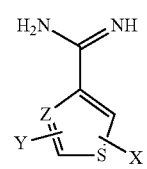

(6)

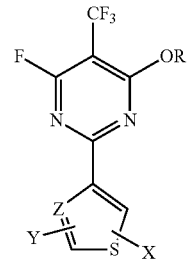

(2)

or (c) a step of reacting a fluoroisobutylene derivative represented by the following formula (4) with a compound represented by the following formula (7) or a salt thereof to obtain a fluorine-containing pyrimidine compound of the following formula (3):

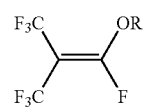

(4)

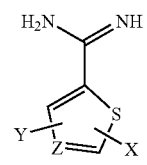

(7)

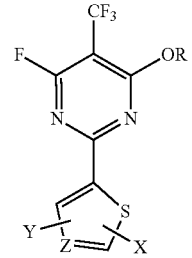

(3)

wherein in the above formulae (1) to (7),

R represents a hydrocarbon group having 1 to 12 carbon atoms,

X and Y each independently represent a hydrogen atom, a halogen atom, a hydrocarbon group having 1 to 10 carbon atoms, $-C_nF_{2n+1}$ (n is an integer of 1 to 10), a nitro group, a boronic acid group, $-OA^1$, $-SO_mA^1$ (m is an integer of 0 to 3), $-NA^1A^2$, $-COOA^1$ or $-CONA^1A^2$, Z represents CW or N, W represents a hydrogen atom, a halogen atom, a hydrocarbon group having 1 to 10 carbon atoms, $-C_nF_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, and A$^1$ and A$^2$ each independently represent a hydrogen atom or a hydrocarbon group having 1 to 10 carbon atoms.

In formula (4), R is the same as that defined in the compounds of formulae (1) to (3) described above, and in formulae (5) to (7), each of X, Y and Z is the same as that defined in the compounds of formulae (1) to (3) described above. Further, in formulae (5) to (7), when Z is CW, as described above, when W and X are adjacent to each other, W and X may be bonded to each other to form a ring together with the carbon atoms to which they are bonded, and when W and Y are adjacent to each other, W and Y may be bonded to each other to form a ring together with the carbon atoms to which they are bonded.

R in the above formulae (1) to (4) preferably represents an alkyl group having 1 to 10 carbon atoms. R in formula (4) can be, for example, an alkyl group having 1 to 10 carbon atoms in R in formulae (1) to (3) described above.

A reaction of (a) above between the fluoroisobutylene derivative represented by formula (4) and the compound represented by formula (5) is represented by the following reaction formula (A).

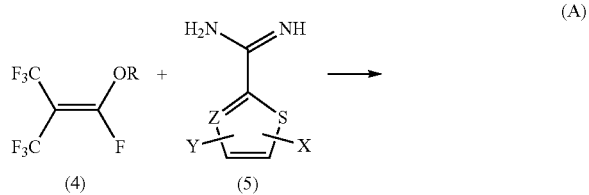

A reaction of (b) above between the fluoroisobutylene derivative represented by formula (4) and the compound represented by formula (6) is represented by the following reaction formula (B).

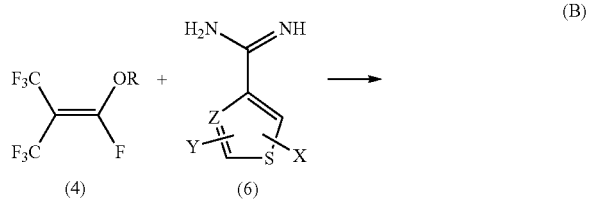

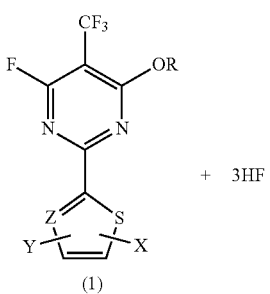

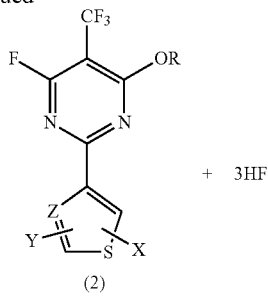

A reaction of (c) above between the fluoroisobutylene derivative represented by formula (4) and the compound represented by formula (7) is represented by the following reaction formula (C).

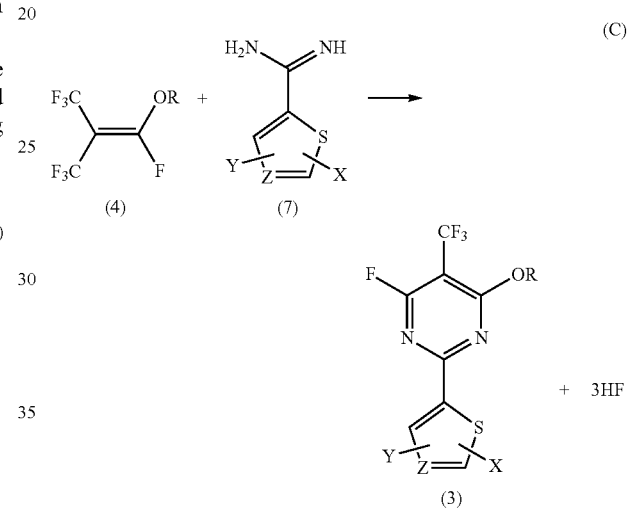

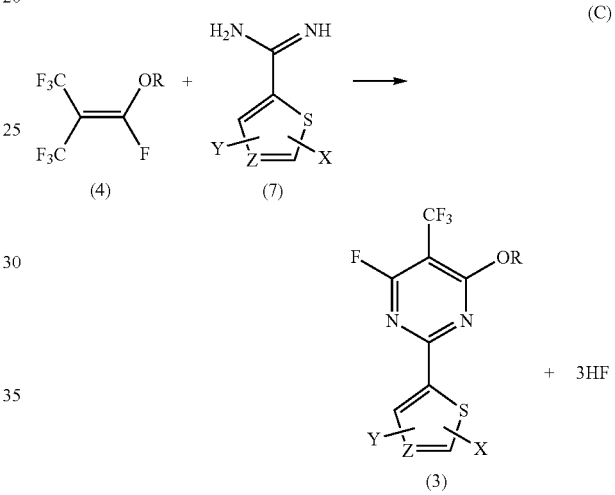

In the above reaction formulae (A) to (C), the compounds of the above formulae (5) to (7) each may be in the form of salt. Examples of the compounds of formulae (5) to (7) in the form of salts include a compound in a form of at least one of the amino moiety (—NH$_2$) and the imino moiety (=NH) constituting the amidino group of the compounds of formulae (5) to (7), being cationized to (—NH$_3^+$) and (=NH$_2^+$) to form a salt with the counterion. The counterion is not particularly limited as long as it is a monovalent anion, and includes, for example, halide ions such as F$^-$, Cl$^-$, Br$^-$ and I$^-$.

In the method for producing a fluorine-containing pyrimidine compound in one embodiment, for example, the reactions of (a) to (c) above can be carried out in one step in the presence of a hydrogen halide scavenger. Therefore, the fluorine-containing pyrimidine compounds of the above formulae (1) to (3) can be easily obtained. In the reactions of (a) to (c) above, a cyclic pyrimidine structure is formed between the fluoroisobutylene derivative represented by formula (4) and the amidino group of the compounds of formulae (5) to (7). At the 2-position of the pyrimidine structure, a group derived from the thiophene ring structure or the thiazole ring structure of the compounds of formulae (5) to (7) is located. Further, —OR, CF$_3$ and F derived from the fluoroisobutylene derivative are located at the 4-position, 5-position and 6-position of the pyrimidine structure, respectively.

The hydrogen halide scavenger is a substance having a function of capturing hydrogen fluoride (HF) formed from a hydrogen atom derived from the amidino group in the compounds of formulae (5) to (7) and a fluorine atom derived from the fluoroisobutylene derivative of formula (4), in the reaction formulae (A) to (C). As the hydrogen halide scavenger, an inorganic compound such as sodium hydroxide, potassium hydroxide, calcium hydroxide, sodium carbonate, potassium carbonate, sodium fluoride and potassium fluoride, and an organic nitrogen derivative such as pyridine, triethylamine, diisopropylethylamine, diazabicyclononene, diazabicycloundecene, methyltriazabicyclodecene and diazabicyclooctane, can be used.

A reaction temperature upon reactions (a) to (c) above is preferably 0 to 100° C., more preferably 5 to 50° C., and still more preferably 10 to 20° C. A reaction time upon reactions (a) to (c) above is preferably 0.5 to 48 hours, more preferably 1 to 36 hours, and still more preferably 2 to 12 hours.

A solvent used in the reactions of (a) to (c) above includes aprotic polar solvents such as tetrahydrofuran, monoglyme, diglyme, triglyme, tetraglyme, acetonitrile, dimethylformamide, dimethylacetamide, methylpyrrolidone, dimethylethyleneurea, tetramethylurea, dimethylsulfoxide and sulfolane, or two-phase solvents of a protonic polar solvent such as water and a water-insoluble solvent such as dichloromethane, toluene and diethyl ether. Moreover, as a catalyst for the reactions of (a) to (c) above, quaternary ammonium halides such as benzyltriethylammonium chloride, a quaternary phosphonium halide and crown ether can be used.

A method for producing a fluorine-containing pyrimidine compound of another embodiment includes:

(d) a step of reacting a fluoroisobutane derivative represented by the following formula (8) with a compound represented by the following formula (5) or a salt thereof to obtain a fluorine-containing pyrimidine compound of the following formula (1):

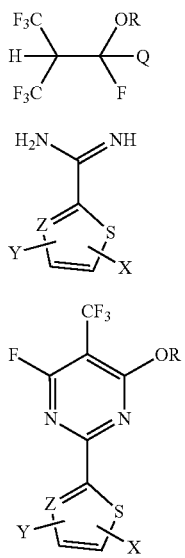

(e) a step of reacting a fluoroisobutane derivative represented by the following formula (8) with a compound represented by the following formula (6) or a salt thereof to obtain a fluorine-containing pyrimidine compound of the following formula (2):

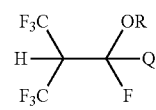

(8)

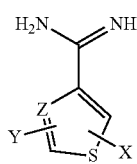

(6)

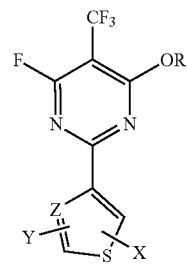

(2)

or (f) a step of reacting a fluoroisobutane derivative represented by the following formula (8) with a compound represented by the following formula (7) or a salt thereof to obtain a fluorine-containing pyrimidine compound of the following formula (3):

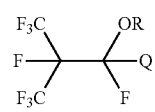

(8)

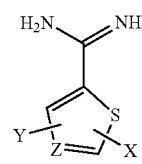

(7)

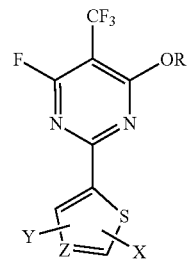

(3)

wherein in the above formulae (1) to (3) and (5) to (8),

Q represents a halogen atom, $-OA^1$, $-SO_mA^1$ (m is an integer of 0 to 3) or $-NA^1A^2$, R represents a hydrocarbon group having 1 to 12 carbon atoms, X and Y each independently represent a hydrogen atom, a halogen atom, a hydrocarbon group having 1 to 10 carbon atoms, $-C_nF_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, Z represents CW or N, W represents a hydrogen atom, a halogen atom, a hydrocarbon group having 1 to 10 carbon atoms, —C$_n$F$_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, and A$^1$ and A$^2$ each independently represent a hydrogen atom or a hydrocarbon group having 1 to 10 carbon atoms.

In formula (8), R is the same as that defined in the compounds of formulae (1) to (3) described above, and the halogen atom, —OA$^1$, —SO$_m$A$^1$ (m is an integer of 0 to 3) and —NA$^1$A$^2$ are the same as those defined in the compounds of formulae (1) to (3) described above.

R in the above formulae (1) to (3) and (8) preferably represents an alkyl group having 1 to 10 carbon atoms. R in formula (8) can be, for example, an alkyl group having 1 to 10 carbon atoms in R in formulae (1) to (3) described above.

A reaction of (d) above between the fluoroisobutane derivative represented by formula (8) and the compound represented by formula (5) is represented by the following reaction formula (D).

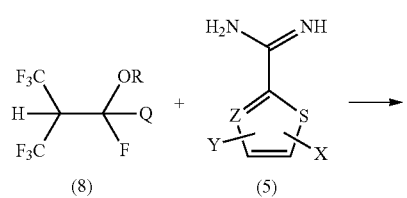

(D)

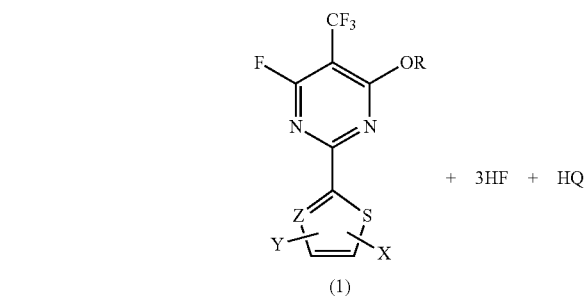

(1)

A reaction of (e) above between the fluoroisobutane derivative represented by formula (8) and the compound represented by formula (6) is represented by the following reaction formula (E).

(E)

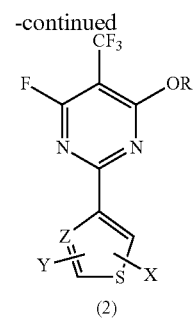

(2)

A reaction of (f) above between the fluoroisobutane derivative represented by formula (8) and the compound represented by formula (7) is represented by the following reaction formula (F).

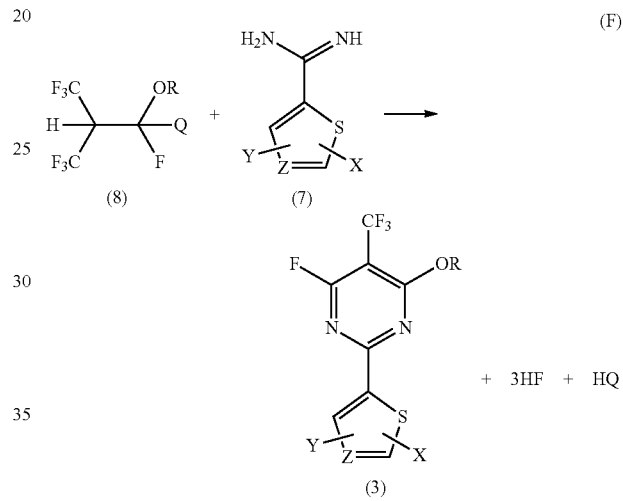

(3)

In the reaction formulae (D) to (F), the compounds of formulae (5) to (7) each may be in the form of salts. Examples of the compounds of formulae (5) to (7) in the form of salts include a compound in the form of at least one of the amino moiety (—NH$_2$) and the imino moiety (=NH) constituting the amidino group of the compounds of formulae (5) to (7), being cationized to (—NH$_3^+$) and (=NH$_2^+$) to form a salt with the counterion. The counterion is not particularly limited as long as it is a monovalent anion, and includes, for example, halide ions such as F$^-$, Cl$^-$, Br$^-$ and I$^-$.

In the method for producing a fluorine-containing pyrimidine compound in the other embodiment, for example, the reactions of (D) to (F) above can be carried out in one step. Therefore, the fluorine-containing pyrimidine compounds of the above formulae (1) to (3) can be easily obtained. In the reactions of (d) to (f) above, a cyclic pyrimidine structure is formed between the fluoroisobutane derivative represented by formula (8) and the amidino group of the compounds of formulae (5) to (7). At the 2-position of the pyrimidine structure, a group derived from the thiophene ring structure or the thiazole ring structure of the compounds of formulae (5) to (7) is located. Further, —OR, CF$_3$ and F derived from the fluoroisobutane derivative are located at the 4-position, 5-position and 6-position of the pyrimidine structure, respectively.

A reaction temperature upon reactions (d) to (f) above is preferably 0 to 100° C., more preferably 5 to 50° C., and still more preferably 10 to 20° C. A reaction time upon reactions (d) to (f) above is preferably 0.5 to 48 hours, more preferably 1 to 36 hours, and still more preferably 4 to 24 hours. In the reactions of (d) to (f) above, the same hydrogen halide scavengers as those of (a) to (c) above may be used.

A solvent used in the reactions of (d) to (f) above includes aprotic polar solvents such as tetrahydrofuran, monoglyme, diglyme, triglyme, tetraglyme, acetonitrile, dimethylformamide, dimethylacetamide, methylpyrrolidone, dimethylethyleneurea, tetramethylurea, dimethylsulfoxide and sulfolane, or two-phase solvents of a protonic polar solvent such as water and a water-insoluble solvent such as dichloromethane, toluene and diethyl ether. Moreover, as a catalyst for the reactions of (d) to (f) above, quaternary ammonium halides such as benzyltriethylammonium chloride, a quaternary phosphonium halide and crown ether can be used.

Although the embodiments of the present disclosure have been described above, the present disclosure is not limited to the aforementioned embodiments, and includes all aspects included in the concept and claims of the present disclosure, and can be variously modified within the scope of the present disclosure.

EXAMPLES

Hereinafter, Examples of the present disclosure will be described, but the present disclosure is not limited to these Examples as long as the gist of the present disclosure is not exceeded. Moreover, room temperature denotes a temperature within the range of 20° C.±5° C. unless otherwise specified.

Example 1

Production of 6-fluoro-4-methoxy-2-(2-thienyl)-5-(trifluoromethyl)pyrimidine

Under ice-water cooling, to 25 g of dichloromethane and 25 g of water were added 10 g (61 mmol) of 2-amidinothiophene hydrochloride and 13 g (61 mmol) of 1,3,3,3-tetrafluoro-1-methoxy-2-(trifluoromethyl)-1-propene. Subsequently, 50 ml (0.24 mol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification to obtain 4.6 g of the compound represented by the following formula (9) (chemical formula: $C_{10}H_6F_4N_2OS$, molecular weight: 278.22 g/mol). The isolated yield of the obtained compound was 14%.

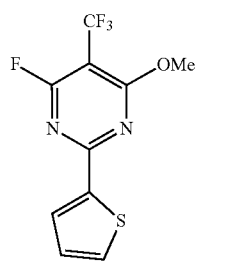

(9)

The analysis results were as follows.
Mass Spectrum (APCI, m/z): 278 ([M]$^+$)
$^1$H-NMR (300 MHz, CDCl$_3$) δ ppm: 8.05 (d, 1H), 7.59 (d, 1H), 7.15 (dd, 1H), 4.18 (s, 3H)

$^{19}$F-NMR (300 MHz, C$_6$F$_6$) δ ppm: −58.26 (d, 3F), −61.72 (dd, 1F)

Example 2

Production of 6-fluoro-4-methoxy-2-(3-thienyl)-5-(trifluoromethyl)pyrimidine

Under ice-water cooling, to 25 g of dichloromethane and 25 g of water were added 10 g (61 mmol) of 3-amidinothiophene hydrochloride and 13 g (61 mmol) of 1,3,3,3-tetrafluoro-1-methoxy-2-(trifluoromethyl)-1-propene. Subsequently, 50 ml (0.24 mol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification to obtain 2.0 g of the compound represented by the following formula (10) (chemical formula: $C_{10}H_6F_4N_2OS$, molecular weight: 278.22 g/mol). The isolated yield of the obtained compound was 58%.

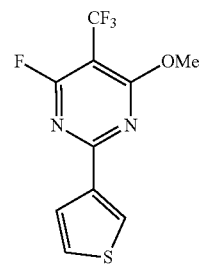

(10)

The analysis results were as follows.
Mass Spectrum (APCI, m/z): 278 ([M]$^+$)
$^1$H-NMR (300 MHz, CDCl$_3$) δ ppm: 8.40 (d, 1H), 7.84 (d, 1H), 7.39 (dd, 1H), 4.20 (s, 3H)
$^{19}$F-NMR (300 MHz, C$_6$F$_6$) δ ppm: −58.40 (d, 3F), −61.79 (dd, 1F)

Example 3

Production of 6-fluoro-4-methoxy-2-(2-thiazolyl)-5-(trifluoromethyl)pyrimidine

Under ice-water cooling, to 50 g of dichloromethane and 50 g of water were added 5 g (31 mmol) of 2-amidinothiazole hydrochloride and 4 g (18 mmol) of 1,3,3,3-tetrafluoro-1-methoxy-2-(trifluoromethyl)-1-propene. Subsequently, 15 ml (72 mmol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification to obtain 0.6 g of the compound represented by the following formula (11) (chemical formula: $C_9H_5F_4N_3OS$, molecular weight: 279.21 g/mol). The isolated yield of the obtained compound was 7%.

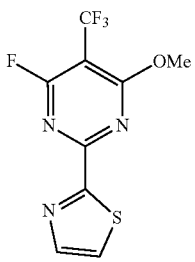

(11)

The analysis results were as follows.
Mass Spectrum (APCI, m/z): 279 ([M]$^+$)
$^1$H-NMR (300 MHz, CDCl$_3$) δ ppm: 8.12 (d, 1H), 7.67 (d, 1H), 4.28 (s, 3H)
$^{19}$F-NMR (300 MHz, C$_6$F$_6$) δ ppm: −58.75 (d, 3F), −59.83 (dd, 1F)

Example 4

Production of 6-fluoro-4-methoxy-2-(2-thienyl)-5-(trifluoromethyl)pyrimidine by using 1,1,1,3,3-pentafluoro-3-methoxy-2-(trifluoromethyl)-propane instead of 1,3,3,3-tetrafluoro-1-methoxy-2-(trifluoromethyl)-1-propene of Example 1

Under ice-water cooling, to 25 g of dichloromethane and 25 g of water were added 10 g (61 mmol) of 2-amidinothiophene hydrochloride and 14 g (61 mmol) of 1,1,1,3,3-pentafluoro-3-methoxy-2-(trifluoromethyl)-propane. Subsequently, 65 ml (0.31 mol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification. The analysis results of the obtained compound were the same as those of the product of Example 1.

Example 5

Production of 6-fluoro-4-methoxy-2-(3-thienyl)-5-(trifluoromethyl)pyrimidine by using 1,1,1,3,3-pentafluoro-3-methoxy-2-(trifluoromethyl)-propane instead of 1,3,3,3-tetrafluoro-1-methoxy-2-(trifluoromethyl)-1-propene of Example 2

Under ice-water cooling, to 25 g of dichloromethane and 25 g of water were added 10 g (61 mmol) of 3-amidinothiophene hydrochloride and 14 g (61 mmol) of 1,1,1,3,3-pentafluoro-3-methoxy-2-(trifluoromethyl)-propane. Subsequently, 65 ml (0.31 mol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification. The analysis results of the obtained compound were the same as those of the product of Example 2.

Example 6

Production of 6-fluoro-4-methoxy-2-(2-thiazolyl)-5-(trifluoromethyl)pyrimidine by using 1,1,1,3,3-pentafluoro-3-methoxy-2-(trifluoromethyl)-propane instead of 1,3,3,3-tetrafluoro-1-methoxy-2-(trifluoromethyl)-1-propene of Example 3

Under ice-water cooling, to 50 g of dichloromethane and 50 g of water were added 5 g (31 mmol) of 2-amidinothiazole hydrochloride and 4 g (18 mmol) of 1,1,1,3,3-pentafluoro-3-methoxy-2-(trifluoromethyl)-propane. Subsequently, 19 ml (90 mmol) of a 5 N sodium hydroxide aqueous solution was added dropwise such that the internal temperature did not exceed 10° C., and the temperature was raised to room temperature. After about 16 hours, the organic phase was fractionated, and then dichloromethane was distilled off under reduced pressure, and thereafter the residue was dissolved in ethyl acetate followed by column purification. The analysis results of the obtained compound were the same as those of the product of Example 3.

In Examples 4 to 6, the yields of the obtained compounds were not calculated, but types and amounts of impurities are expected to be increased due to by-products that can be generated in the course of producing 1,3,3,3-tetrafluoro-1-methoxy-2-(trifluoromethyl)-1-propene from 1,1,1,3,3-pentafluoro-3-methoxy-2-trifluoromethyl-propane in the reaction system. Therefore, the production methods of Examples 1, 2 and 3 are conjectured to give high yields of the obtained products as compared with the corresponding production methods of Examples 4, 5 and 6.

Example 7

Production of 6-fluoro-4-methoxy-2-(5-thiazolyl)-5-(trifluoromethyl)pyrimidine 0.7 g (4.3 mmol) of 5-amidinothiazole hydrochloride was dissolved in 45 ml of acetonitrile, to this were added 1.1 g (5.2 mmol) of 1,3,3,3-tetrafluoro-1-methoxy-2-(trifluoromethyl)-1-propene and 2.9 g (22.4 mmol) of N,N-diisopropylethylamine, and the mixture was stirred at room temperature for 22.5 hours. After stirring, the reaction solution was purified by a column to obtain 0.5 g (1.7 mmol) of the compound represented by the following formula (12). The isolated yield of the obtained compound was 39.2%.

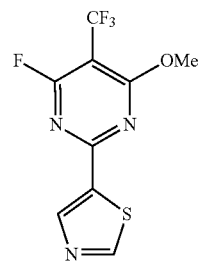

(12)

The analysis results were as follows.
Mass Spectrum (APCI, m/z): 279.7 ([M+H]$^+$)
$^1$H-NMR (400 MHz, CDCl$_3$) δ ppm: 8.98 (s, 1H), 8.78 (s, 1H), 4.21 (s, 3H)

Example 8

Production of 6-fluoro-4-methoxy-2-(4-thiazolyl)-5-(trifluoromethyl)pyrimidine 0.5 g (3.1 mmol) of 4-amidinothiazole hydrochloride was dissolved in 30 ml of acetonitrile, to this were added 0.8 g (3.8 mmol) of 1,3,3,3-tetrafluoro-1-methoxy-2-(trifluoromethyl)-1-propene and 2.1 g (16.2 mmol) of N,N-diisopropylethylamine, and the mixture was stirred at room temperature for 17 hours. After stirring, the reaction solution was purified by a column to obtain 0.5 g (1.8 mmol) of the compound represented by the following formula (13). The isolated yield of the obtained compound was 58.5%.

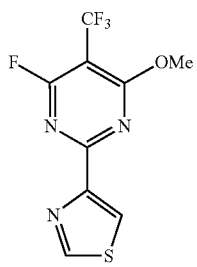

(13)

The analysis results were as follows.
Mass Spectrum (APCI, m/z): 279.4 ([M+H]$^+$)
$^1$H NMR (400 MHz, CDCl$_3$) δ ppm: 8.97 (d, J=2.1 Hz, 1H), 8.51 (d, J=2.1 Hz, 1H), 4.26 (s, 3H)

Example 9

Production of 6-fluoro-2-(5-fluoro-2-thienyl)-4-methoxy-5-(trifluoromethyl)pyrimidine 0.6 g (3.4 mmol) of 5-fluoro-2-amidinothiophene hydrochloride was dissolved in 35 ml of acetonitrile, to this were added 0.8 g (3.8 mmol) of 1,3,3,3-tetrafluoro-1-methoxy-2-(trifluoromethyl)-1-propene and 2.3 g (17.8 mmol) of N,N-diisopropylethylamine, and the mixture was stirred at room temperature for 22 hours. After stirring, the reaction solution was purified by a column to obtain 0.6 g (2.1 mmol) of the compound represented by the following formula (14). The isolated yield of the obtained compound was 61.2%.

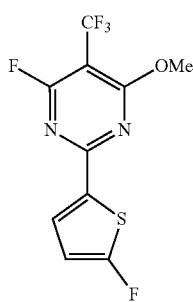

(14)

The analysis results were as follows.
Mass Spectrum (APCI, m/z): 295.6 ([M+H]$^+$)
$^1$H NMR (400 MHz, CDCl$_3$) δ ppm: 7.77 (dd, J=4.4, 3.8 Hz, 1H), 6.59 (dd, J=4.3, 1.5 Hz, 1H), 4.16 (s, 3H)

Example 10

Production of 2-(5-chloro-2-thienyl)-6-fluoro-4-methoxy-5-(trifluoromethyl)pyrimidine 0.5 g (2.6 mmol) of 5-chlorothiophene-2-carboxyimideamide hydrochloride was dissolved in 25 ml of acetonitrile, to this were added 0.7 g (3.3 mmol) of 1,3,3,3-tetrafluoro-1-methoxy-2-(trifluoromethyl)-1-propene and 1.7 g (13.2 mmol) of N,N-diisopropylethylamine, and the mixture was stirred at room temperature for 28 hours. After stirring, the reaction solution was purified by a column to obtain 0.3 g (1.1 mmol) of the compound represented by the following formula (15). The isolated yield of the obtained compound was 41.9%.

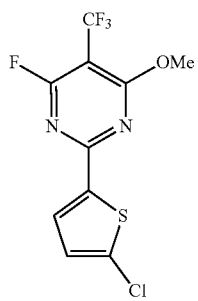

(15)

The analysis results were as follows.
Mass Spectrum (APCI, m/z): 312.0 ([M+H]$^+$)
$^1$H NMR (400 MHz, CDCl$_3$) δ ppm: 7.86 (d, J=4.0 Hz, 1H), 7.00 (d, J=4.0 Hz, 1H), 4.17 (s, 3H)

Example 11

Production of 2-(4-bromo-3-thienyl)-6-fluoro-4-methoxy-5-(trifluoromethyl)pyrimidine 0.4 g of a crude purified product of 4-bromo-3-amidinothiophene hydrochloride was dissolved in 15 ml of acetonitrile, to this were added 0.4 g (1.9 mmol) of 1,3,3,3-tetrafluoro-1-methoxy-2-(trifluoromethyl)-1-propene and 1.0 g (7.7 mmol) of N,N-diisopropylethylamine, and the mixture was stirred at room temperature for 19.8 hours. After stirring, the reaction solution was purified by a column to obtain 0.1 g (0.2 mmol) of the compound represented by the following formula (16). The 3-step yield of the obtained compound was 4.2%.

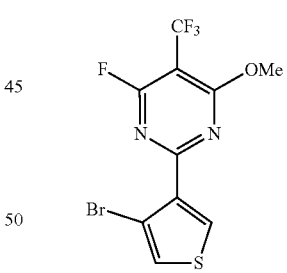

(16)

The analysis results were as follows.
Mass Spectrum (APCI, m/z): 357.7 ([M+H]$^+$)
$^1$H NMR (400 MHz, CDCl$_3$) δ ppm: 8.38 (d, J=3.7 Hz, 1H), 7.42 (d, J=3.7 Hz, 1H), 4.25 (s, 3H)

Example 12

Production of 6-fluoro-2-(5-iodo-2-thienyl)-4-methoxy-5-(trifluoromethyl)pyrimidine 0.6 g (2.1 mmol) of 5-iodo-2-amidinothiophene hydrochloride was dissolved in 21 ml of acetonitrile, to this were added 0.5 g (2.4 mmol) of 1,3,3,3-tetrafluoro-1-methoxy-2-(trifluoromethyl)-1-propene and 1.4 g (10.8 mmol) of N,N-diisopropylethylamine, and the mixture was stirred at room temperature for 19 hours. After stirring, the reaction solution was purified by a column to obtain 0.5 g (1.2 mmol) of the compound represented by the following formula (17). The isolated yield of the obtained compound was 58.2%.

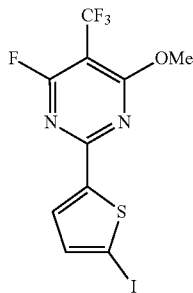

(17)

The analysis results were as follows.
Mass Spectrum (APCI, m/z): 403.6 ([M+H]$^+$)
$^1$H NMR (400 MHz, CDCl$_3$) δ ppm: 7.69 (d, J=4.0 Hz, 1H), 7.33 (d, J=4.0 Hz, 1H), 4.17 (s, 3H)

Example 13

Production of 6-fluoro-4-methoxy-5-(trifluoromethyl)-2-[4-(trifluoromethyl)-2-thiazolyl]pyrimidine 0.5 g (2.1 mmol) of 4-(trifluoromethyl)-1,3-thiazole-2-carboxyimideamide hydrochloride was dissolved in 22 ml of acetonitrile, to this were added 0.6 g (2.8 mmol) of 1,3,3,3-tetrafluoro-1-methoxy-2-(trifluoromethyl)-1-propene and 1.5 g (11.6 mmol) of N,N-diisopropylethylamine, and the mixture was stirred at room temperature for 20.2 hours. After stirring, the reaction solution was purified by a column to obtain 0.2 g (0.6 mmol) of the compound represented by the following formula (18). The isolated yield of the obtained compound was 27.1%.

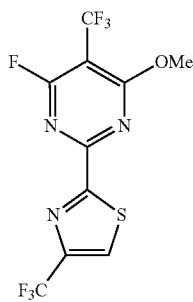

(18)

The analysis results were as follows.
Mass Spectrum (APCI, m/z): 347.0 ([M−H]$^−$)
$^1$H NMR (400 MHz, CDCl$_3$) δ ppm: 8.04 (s, 1H), 4.29 (s, 1H)

Example 14

Production of 6-fluoro-4-methoxy-2-(4-methyl-2-thiazolyl)-5-(trifluoromethyl)pyrimidine 0.2 g (1.7 mmol) of 4-methyl-2-amidino-1,3-thiazole hydrochloride was dissolved in 42 ml of acetonitrile, to this were added 0.5 g (2.3 mmol) of 1,3,3,3-tetrafluoro-1-methoxy-2-(trifluoromethyl)-1-propene and 1.4 g (10.8 mmol) of N,N-diisopropylethylamine, and the mixture was stirred at room temperature for 23.2 hours. After stirring, the reaction solution was purified by a column to obtain 0.6 g (2.0 mmol) of the compound represented by the following formula (19). The isolated yield of the obtained compound was 49.1%.

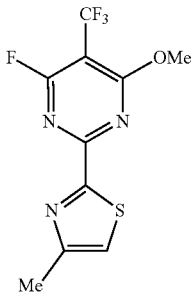

(19)

The analysis results were as follows.
Mass Spectrum (APCI, m/z): 293.1 ([M+H]$^+$)
$^1$H NMR (400 MHz, CDCl$_3$) δ ppm: 7.23 (d, J=0.9 Hz, 1H), 4.25 (s, 3H), 2.61 (d, J=0.9 Hz, 3H)

Example 15

Production of 6-fluoro-4-methoxy-2-(2-methyl-4-thiazolyl)-5-(trifluoromethyl)pyrimidine 0.2 g (1.7 mmol) of 2-methyl-4-amidinothiazole hydrochloride was dissolved in 17 ml of acetonitrile, to this were added 0.5 g (2.4 mmol) of 1,3,3,3-tetrafluoro-1-methoxy-2-(trifluoromethyl)-1-propene and 1.2 g (9.3 mmol) of N,N-diisopropylethylamine, and the mixture was stirred at room temperature for 22.3 hours. After stirring, the reaction solution was purified by a column to obtain 0.2 g (0.8 mmol) of the compound represented by the following formula (20). The isolated yield of the obtained compound was 46.6%.

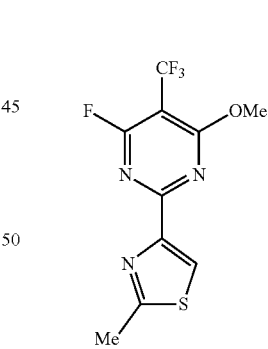

(20)

The analysis results were as follows.
Mass Spectrum (APCI, m/z): 293.2 ([M+H]$^+$)
$^1$H NMR (400 MHz, CDCl$_3$) δ ppm: 8.31 (s, 1H), 4.23 (s, 3H), 2.84 (s, 3H)

Example 16

Production of 6-fluoro-4-methoxy-2-(5-nitro-2-thienyl)-5-(trifluoromethyl)pyrimidine 0.7 g of a crude purified product of 5-nitro-2-amidinothiophene hydrochloride was dissolved in 33 ml of acetonitrile, to this were added 0.8 g (3.8 mmol) of 1,3,3,3-tetrafluoro- 1-methoxy-2-(trifluoromethyl)-1-propene and 2.2 g (17.0 mmol) of N,N-diisopropylethylamine, and the mixture was stirred at room temperature for 21 hours. After stirring, the reaction solution was purified by a column to obtain 0.2 g (0.6 mmol) of the compound represented by the following formula (21). The 3-step yield of the obtained compound was 19%.

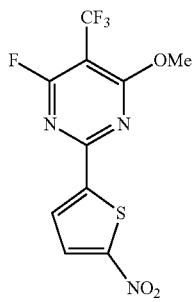

(21)

The analysis results were as follows.
Mass Spectrum (APCI, m/z): 322.3 ([M–H]⁻)
$^1$H NMR (400 MHz, CDCl$_3$) δ ppm: 7.97 (d, J=4.3 Hz, 1H), 7.94 (d, J=4.3 Hz, 1H), 4.23 (s, 3H)

Example 17

Production of 6-fluoro-4-methoxy-2-[5-(methylsulfanyl)-2-thienyl]-5-(trifluoromethyl)pyrimidine 0.5 g (2.4 mmol) of 5-(methylsulfanyl)thiophene-2-carboxyimideamide hydrochloride was dissolved in 24 ml of acetonitrile, to this were added 0.6 g (2.8 mmol) of 1,3,3,3-tetrafluoro-1-methoxy-2-(trifluoromethyl)-1-propene and 1.6 g (12.4 mmol) of N,N-diisopropylethylamine, and the mixture was stirred at room temperature for 18.3 hours. After stirring, the reaction solution was purified by a column to obtain 0.5 g (1.6 mmol) of the compound represented by the following formula (22). The isolated yield of the obtained compound was 67.6%.

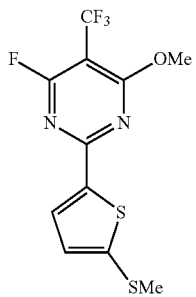

(22)

The analysis results were as follows.
Mass Spectrum (APCI, m/z): 324.0 ([M+H]⁺)
$^1$H NMR (400 MHz, CDCl$_3$) δ ppm: 7.91 (d, J=4.0 Hz, 1H), 6.99 (d, J=4.0 Hz, 1H), 4.17 (s, 3H), 2.62 (s, 3H).

Example 18

Production of 6-fluoro-2-[5-(methanesulfonyl)-2-thienyl]-4-methoxy-5-(trifluoromethyl)pyrimidine 0.5 g (2.1 mmol) of 5-methanesulphonyl-2-amidinothiophene hydrochloride was dissolved in 21 ml of acetonitrile, to this were added 0.5 g (2.3 mmol) of 1,3,3,3-tetrafluoro-1-methoxy-2-(trifluoromethyl)-1-propene and 1.4 g (10.8 mmol) of N,N-diisopropylethylamine, and the mixture was stirred at room temperature for 13.5 hours. After stirring, the reaction solution was purified by a column to obtain 0.3 g (0.9 mmol) of the compound represented by the following formula (23). The isolated yield of the obtained compound was 45.3%.

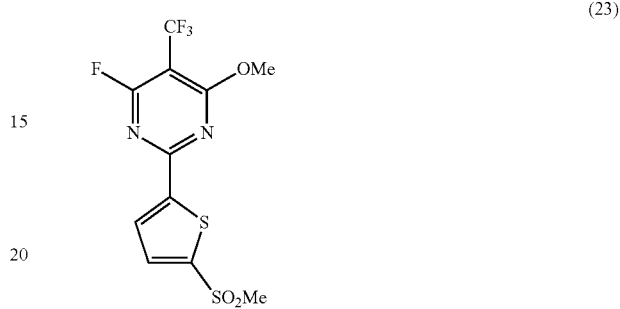

(23)

The analysis results were as follows.
Mass Spectrum (APCI, m/z): 355.5 ([M–H]⁻)
$^1$H NMR (400 MHz, CDCl$_3$) δ ppm: 8.03 (d, J=4.0 Hz, 1H), 7.74 (d, J=4.0 Hz, 1H), 4.21 (s, 3H), 3.24 (s, 3H)

Example 19

Production of 2-[2-(dimethylamino)-5-thiazolyl]-6-fluoro-4-methoxy-5-(trifluoromethyl)pyrimidine 0.1 g (0.7 mmol) of 2-(dimethylamino)-5-amidino-1,3-thiazole hydrochloride was dissolved in 7 ml of acetonitrile, to this were added 0.2 g (0.9 mmol) of 1,3,3,3-tetrafluoro-1-methoxy-2-(trifluoromethyl)-1-propene and 0.5 g (3.9 mmol) of N,N-diisopropylethylamine, and the mixture was stirred at room temperature for 18.3 hours. After stirring, the reaction solution was purified by a column to obtain 0.1 g (0.2 mmol) of the compound represented by the following formula (24). The isolated yield of the obtained compound was 27.0%.

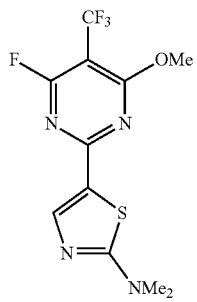

(24)

The analysis results were as follows.
Mass Spectrum (APCI, m/z): 323.1 ([M+H]⁺)
$^1$H NMR (400 MHz, CDCl$_3$) δ ppm: 8.19 (s, 1H), 4.12 (s, 3H), 3.22 (s, 6H)

Example 20

Production of 6-fluoro-4-methoxy-2-(2-methoxy-5-thiazolyl)-5-(trifluoromethyl)pyrimidine 0.6 g (3.3 mmol) of 2-methoxy-5-amidino-1,3-thiazole hydrochloride was dissolved in 33 ml of acetonitrile, to this were added 0.8 g (3.7 mmol) of 1,3,3,3-tetrafluoro-1-methoxy-2-(trifluoromethyl)-1-propene and 2.2 g (17.0 mmol) of N,N-diisopropylethylamine, and the mixture was stirred at room temperature for 19.5 hours. After stirring, the reaction solution was purified by a column to obtain 0.2 g (0.8 mmol) of the compound represented by the following formula (25). The isolated yield of the obtained compound was 23.7%.

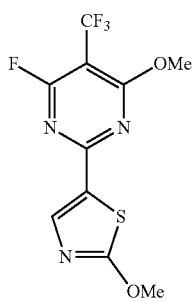

(25)

The analysis results were as follows.
Mass Spectrum (APCI, m/z): 310.2 ([M+H]$^+$)
$^1$H NMR (400 MHz, CDCl$_3$) δ ppm: 7.76 (s, 1H), 4.13 (s, 3H), 3.46 (s, 3H)

Example 21

Production of 6-fluoro-4-methoxy-2-[5-(methoxycarbonyl)-2-thienyl]-5-(trifluoromethyl)pyrimidine 0.6 g (2.8 mmol) of methyl 5-amidinothiophene-2-carboxylate hydrochloride was dissolved in 28 ml of acetonitrile, to this were added 0.7 g (3.3 mmol) of 1,3,3,3-tetrafluoro-1-methoxy-2-(trifluoromethyl)-1-propene and 1.9 g (14.7 mmol) of N,N-diisopropylethylamine, and the mixture was stirred at room temperature for 20.8 hours. After stirring, the reaction solution was purified by a column to obtain 0.6 g (1.6 mmol) of the compound represented by the following formula (26). The isolated yield of the obtained compound was 60.0%.

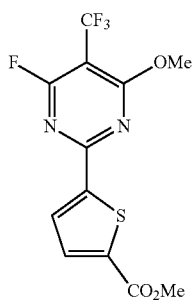

(26)

The analysis results were as follows.
Mass Spectrum (APCI, m/z): 335.3 ([M−H]$^-$)
$^1$H NMR (400 MHz, CDCl$_3$) δ ppm: 8.01 (d, J=4.0 Hz, 1H), 7.80 (d, J=4.0 Hz, 1H), 4.21 (s, 3H), 3.94 (s, 3H)

Test Example of Biological Activity

Evaluation Test for Rice Blast
6-fluoro-4-methoxy-2-(2-thiazolyl)-5-(trifluoromethyl)pyrimidine prepared in Example 3 was dissolved in acetone to prepare a solution having a concentration of 100,000 ppm. Next, to 1 ml of this acetone solution was added sterilized water to make 50 ml to prepare a test solution having a concentration of 2,000 ppm. Further, to 10 ml of a separately prepared test solution having a concentration of 2,000 ppm was added sterilized water to make 20 ml to prepare a test solution having a concentration of 1,000 ppm. 1,000 l of the test solution having a concentration of 2,000 ppm and of the test solution having a concentration of 1,000 ppm were each added dropwise to a separately fabricated oatmeal culture medium, and air-dried. Subsequently, a 4-mm rice blast disc was placed such that flora contacted a treated surface of the oatmeal culture medium. Then, the oatmeal culture medium was allowed to stand still in a thermostatic room at 25° C. for 6 days, and an elongation length of hyphae was then investigated. The results are shown in Table 1. The control value was calculated according to the following expression. In the following expression, "without treatment" means that 1 ml of acetone was diluted with sterilized water to 50 ml as a test solution, and the solution was added dropwise to the culture medium. In addition, "with treatment" means that a test solution that had been diluted and adjusted to a set concentration was added dropwise to the culture medium.

[Table 1]

TABLE 1

| Concentration of test solution (ppm) | Control value |
|---|---|
| 2000 | 100 |
| 1000 | 68 |

Control value={(average of elongation lengths of hyphae without treatment−average of elongation lengths of hyphae with treatment)/average of elongation lengths of hyphae without treatment}×100  [Expression 1]

As shown in Table 1, the fluorine-containing pyrimidine compound of the present disclosure exhibits the control activity against the pathogens of rice blast, and is found to be effective as a compound exhibiting a biological activity.

What is claimed is:

1. A fluorine-containing pyrimidine compound represented by the following formula (1), (2) or (3):

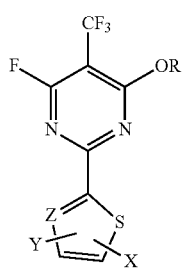

(1)

-continued (2)

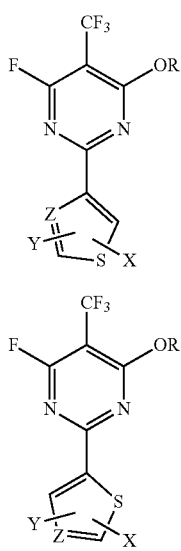

(3)

wherein
R represents a hydrocarbon group having 1 to 12 carbon atoms,
X and Y each independently represent a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$,
Z represents CW or N,
W represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and
$A^1$ and $A^2$ each independently represent a hydrogen atom or a hydrocarbon group having 1 to 10 carbon atoms.

2. The fluorine-containing pyrimidine compound according to claim 1, wherein R is an alkyl group having 1 to 10 carbon atoms.

3. A method for producing a fluorine-containing pyrimidine compound represented by the formula (1), (2), or (3), comprising:

(a) a step of reacting a fluoroisobutylene derivative represented by the following formula (4) with a compound represented by the following formula (5) or a salt thereof to obtain a fluorine-containing pyrimidine compound of the following formula (1):

(4)

F₃C  OR
 \\ /
  C=C
 / \\
F₃C  F (5)

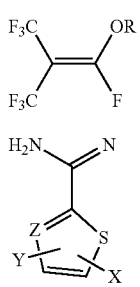

-continued (1)

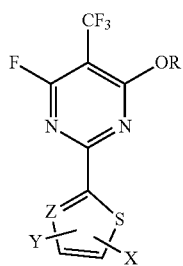

(b) a step of reacting a fluoroisobutylene derivative represented by the following formula (4) with a compound represented by the following formula (6) or a salt thereof to obtain a fluorine-containing pyrimidine compound of the following formula (2):

(4)

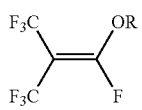

(6)

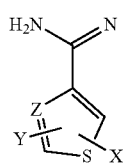

(2)

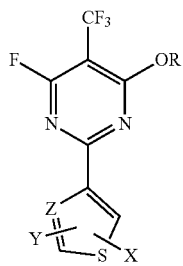

or (c) a step of reacting a fluoroisobutylene derivative represented by the following formula (4) with a compound represented by the following formula (7) or a salt thereof to obtain a fluorine-containing pyrimidine compound of the following formula (3):

(4)

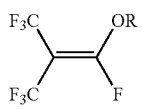

(7)

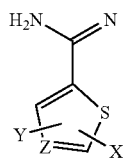

-continued

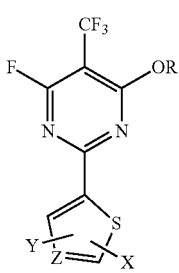
(3)

wherein
R represents a hydrocarbon group having 1 to 12 carbon atoms, X and Y each independently represent a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, Z represents CW or N, W represents a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, and $A^1$ and $A^2$ each independently represent a hydrogen atom or a hydrocarbon group having 1 to 10 carbon atoms.

4. A method for producing a fluorine-containing pyrimidine compound represented by the formula (1), (2), or (3), comprising:

(d) a step of reacting a fluoroisobutane derivative represented by the following formula (8) with a compound represented by the following formula (5) or a salt thereof to obtain a fluorine-containing pyrimidine compound of the following formula (1):

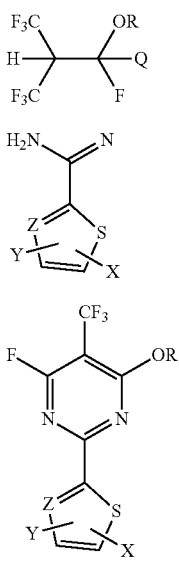
(8)
(5)
(1)

(e) a step of reacting a fluoroisobutane derivative represented by the following formula (8) with a compound represented by the following formula (6) or a salt thereof to obtain a fluorine-containing pyrimidine compound of the following formula (2):

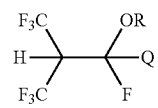
(8)

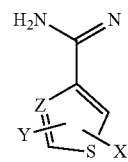
(6)

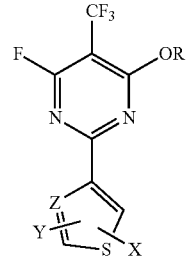
(2)

or (f) a step of reacting a fluoroisobutane derivative represented by the following formula (8) with a compound represented by the following formula (7) or a salt thereof to obtain a fluorine-containing pyrimidine compound of the following formula (3):

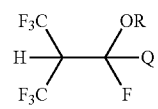
(8)

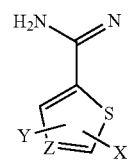
(7)

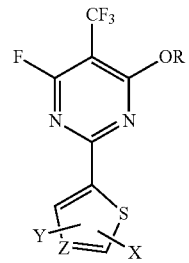
(3)

wherein
Q represents a halogen atom, —$OA^1$, —$SO_mA^1$ where m is an integer of 0 to 3, or —$NA^1A^2$, R represents a hydrocarbon group having 1 to 12 carbon atoms, X and Y each independently represent a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, Z represents CW or N, W represents a hydrogen atom, a halogen atom, a hydrocarbon group having 1 to 10 carbon atoms, —$C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and $A^1$ and $A^2$ each independently represent a hydrogen atom or a hydrocarbon group having 1 to 10 carbon atoms.

5. The method for producing a fluorine-containing pyrimidine compound according to claim 3, wherein R is an alkyl group having 1 to 10 carbon atoms.

6. The method for producing a fluorine-containing pyrimidine compound according to claim 4, wherein R is an alkyl group having 1 to 10 carbon atoms.

* * * * *